(12) United States Patent
    Shain et al.

(10) Patent No.: US 10,648,456 B2
(45) Date of Patent: May 12, 2020

(54) ORGANIC CONDUCTIVE ELEMENTS FOR DEICING AND LIGHTNING PROTECTION OF A WIND TURBINE ROTOR BLADE

(71) Applicant: General Electric Company, Schenectady, NY (US)

(72) Inventors: Eric Michael Shain, Simpsonville, SC (US); Jignesh Patel, Boiling Springs, SC (US); Richard Hardison, Greenville, SC (US); Amir Riahi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 257 days.

(21) Appl. No.: 15/299,508

(22) Filed: Oct. 21, 2016

(65) Prior Publication Data

US 2018/0112649 A1    Apr. 26, 2018

(51) Int. Cl.
   *F03D 80/30*      (2016.01)
   *F03D 80/40*      (2016.01)
   *F03D 1/06*       (2006.01)

(52) U.S. Cl.
   CPC ........... *F03D 80/30* (2016.05); *F03D 1/0675* (2013.01); *F03D 80/40* (2016.05);
   (Continued)

(58) Field of Classification Search
   CPC ...... F03D 80/30; F03D 80/40; F03D 11/0025; B64D 15/18; Y02E 10/721
   See application file for complete search history.

(56) References Cited

U.S. PATENT DOCUMENTS 4,903,446 A * 2/1990 Richards ............... E04B 1/06
                                                  52/223.6
5,945,084 A * 8/1999 Droege ............... C04B 38/0022
                                                  423/447.4
(Continued)

FOREIGN PATENT DOCUMENTS

EP       0783629 A1      7/1997
EP       2675030 A1 *   12/2013    ............. H02G 13/80
(Continued)

OTHER PUBLICATIONS

English machine translation of discription from EP 2675030 (Year: 2013).*

*Primary Examiner* — Dwayne J White
*Assistant Examiner* — Wesley L E Fisher
(74) *Attorney, Agent, or Firm* — Dority & Manning, P.A.

(57) ABSTRACT

The present disclosure is directed to a rotor blade assembly for a wind turbine. The rotor blade assembly includes a rotor blade having a body shell with a pressure side, a suction side, a leading edge, and a trailing edge each extending between a root portion and a tip portion. Further, the rotor blade assembly includes a protection system configured to protect the rotor blade from ice accumulation or a lightning strike. The protection system includes at least one organic conductive element configured within the rotor blade. The protection system also includes a conductor source electrically or thermally coupled to the organic conductive element. Thus, the conductor source is configured to heat the organic conductive element so as to prevent ice from accumulating on the rotor blade or to provide a conductive path for the lightning strike.

11 Claims, 9 Drawing Sheets

(52) U.S. Cl.
CPC ... *F05B 2280/2006* (2013.01); *F05B 2280/40* (2013.01); *F05B 2280/4011* (2013.01); *Y02E 10/721* (2013.01)

(56) References Cited

U.S. PATENT DOCUMENTS

| | | | |
|---|---|---|---|
| 6,612,810 | B1 | 9/2003 | Olsen et al. |
| 6,890,152 | B1 | 5/2005 | Thisted |
| 7,086,834 | B2 | 8/2006 | LeMieux |
| 7,217,091 | B2 | 5/2007 | LeMieux |
| 7,494,324 | B2 * | 2/2009 | Hibbard ............... H02G 13/00 416/230 |
| 7,854,594 | B2 * | 12/2010 | Judge .................. B29C 66/124 416/226 |
| 7,883,319 | B2 * | 2/2011 | Volkmer ............... F03D 17/00 416/146 R |
| 7,896,616 | B2 | 3/2011 | Livingston et al. |
| 7,922,449 | B2 | 4/2011 | Scholte-Wassink |
| 8,038,397 | B2 | 10/2011 | Saddoughi et al. |
| 8,038,398 | B2 | 10/2011 | Nanukuttan et al. |
| 8,062,431 | B2 | 11/2011 | Kumar et al. |
| 8,221,075 | B2 | 7/2012 | Nies et al. |
| 8,292,579 | B2 | 10/2012 | Magnuson |
| 8,342,805 | B2 * | 1/2013 | Mendez Hernandez ............... F01D 11/00 244/1 A |
| 8,734,110 | B2 | 5/2014 | Kuroiwa et al. |
| 9,051,921 | B2 | 6/2015 | Arocena De La Rua et al. |
| 9,797,381 | B2 * | 10/2017 | Iriarte Eleta ............ F03D 80/40 |
| 10,458,396 | B2 * | 10/2019 | Philipsen ............... F03D 80/40 |
| 2006/0280613 | A1 * | 12/2006 | Hansen ............... H02G 13/00 416/230 |
| 2010/0135797 | A1 | 6/2010 | Nies |
| 2011/0171032 | A1 * | 7/2011 | Hancock .............. B25B 11/02 416/223 R |
| 2012/0111532 | A1 * | 5/2012 | Le Besnerais .......... F03D 80/60 165/47 |
| 2012/0321376 | A1 * | 12/2012 | Walters ................. B29C 65/42 403/267 |
| 2013/0022466 | A1 | 1/2013 | Laurberg |
| 2013/0164133 | A1 * | 6/2013 | Grove-Nielsen .... F03D 11/0025 416/95 |
| 2013/0280087 | A1 * | 10/2013 | Appleton ................ B29C 44/06 416/241 A |
| 2014/0127017 | A1 * | 5/2014 | Virtanen ................. C09D 5/24 416/95 |
| 2014/0191082 | A1 | 7/2014 | Figueroa-Karlstrom |
| 2014/0199170 | A1 | 7/2014 | Madsen et al. |
| 2014/0241896 | A1 | 8/2014 | Zhang et al. |
| 2014/0301859 | A1 * | 10/2014 | Hancock ................ F03D 1/0675 416/230 |
| 2015/0003998 | A1 * | 1/2015 | Lauritsen ............... F03D 1/0675 416/96 R |
| 2015/0056074 | A1 | 2/2015 | Veldkamp et al. |
| 2015/0098823 | A1 | 4/2015 | Iriarte Eleta et al. |
| 2015/0125309 | A1 * | 5/2015 | Lauritsen ............... F03D 1/0675 416/97 R |
| 2016/0177926 | A1 * | 6/2016 | Akhtar ................... F03D 80/30 416/229 A |
| 2016/0369781 | A1 * | 12/2016 | March Nomen ..... F03D 1/0675 |
| 2017/0073494 | A1 * | 3/2017 | Garoff ..................... C08K 3/04 |

FOREIGN PATENT DOCUMENTS

| | | |
|---|---|---|
| EP | 2675030 A1 | 12/2013 |
| EP | 2843228 A1 | 3/2015 |

* cited by examiner

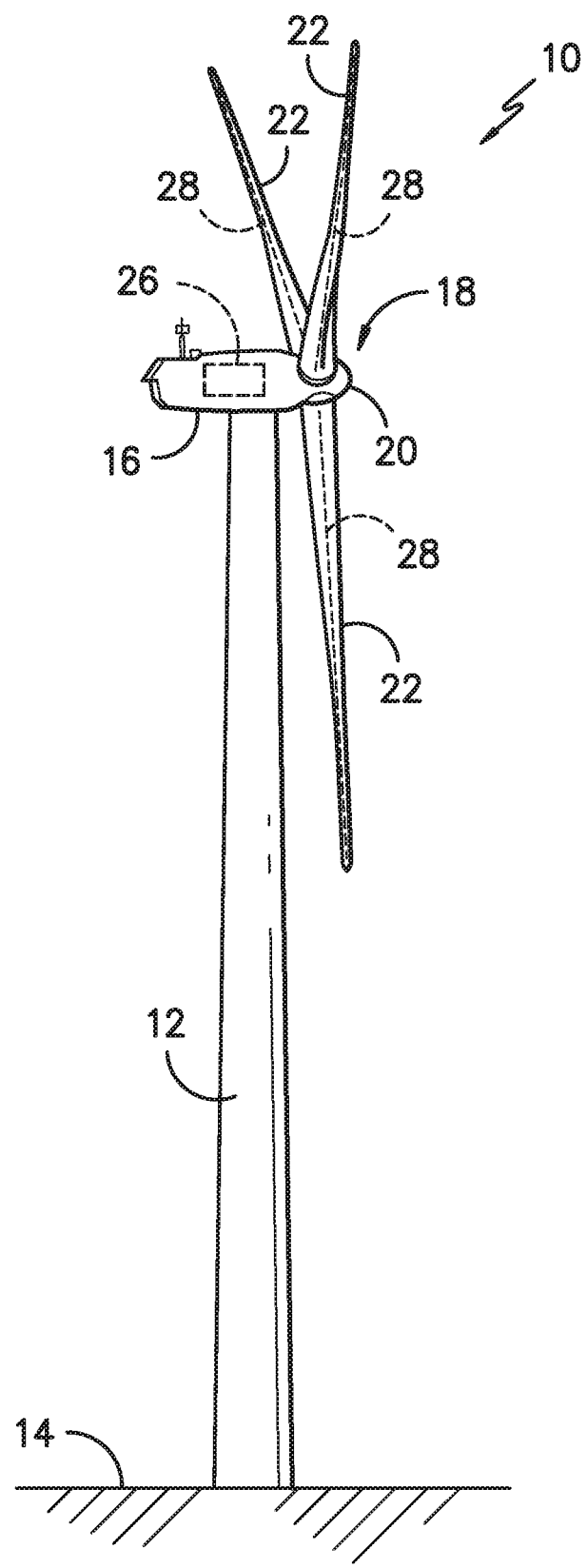
FIG. -1-

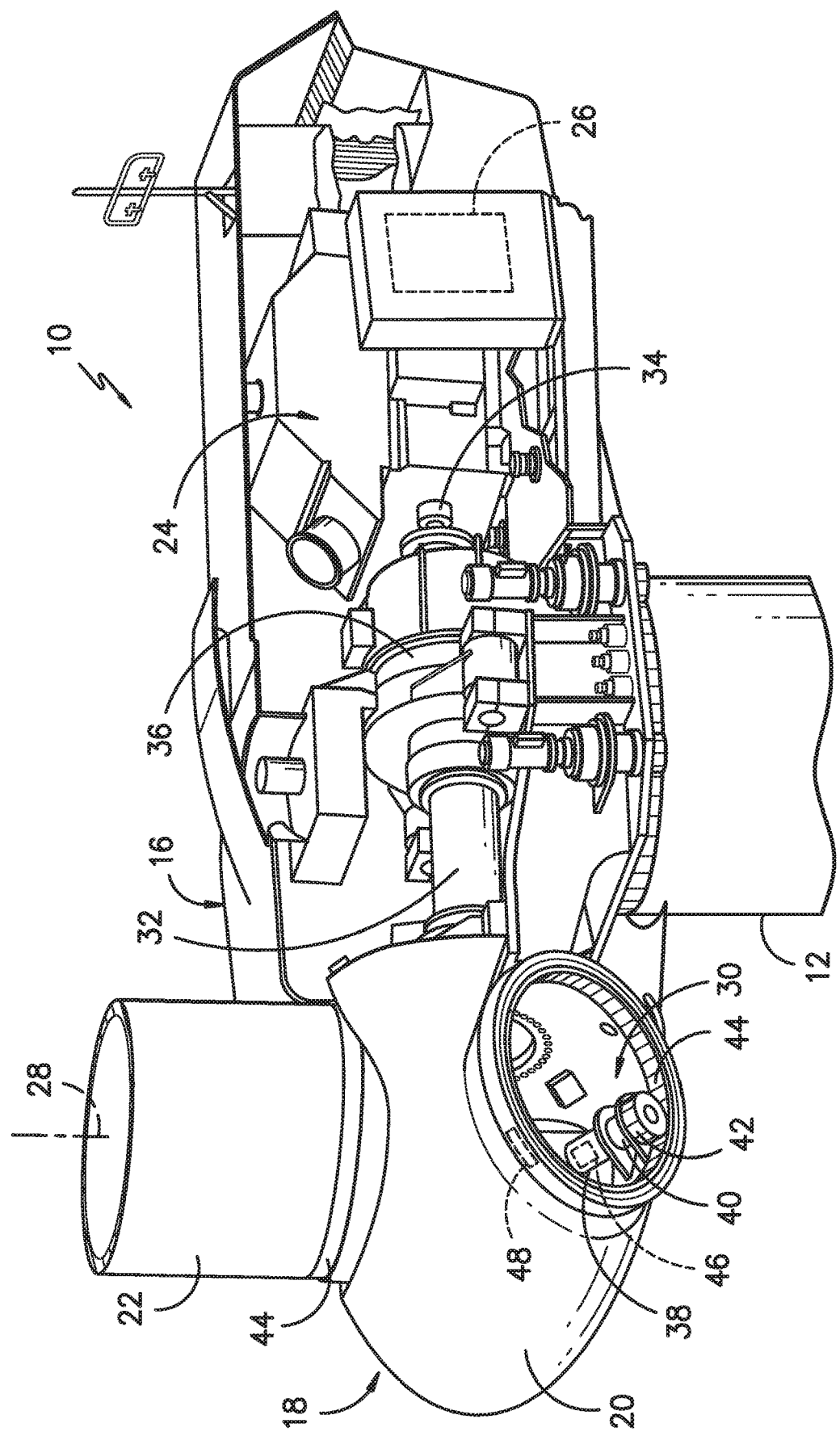
FIG. -2-

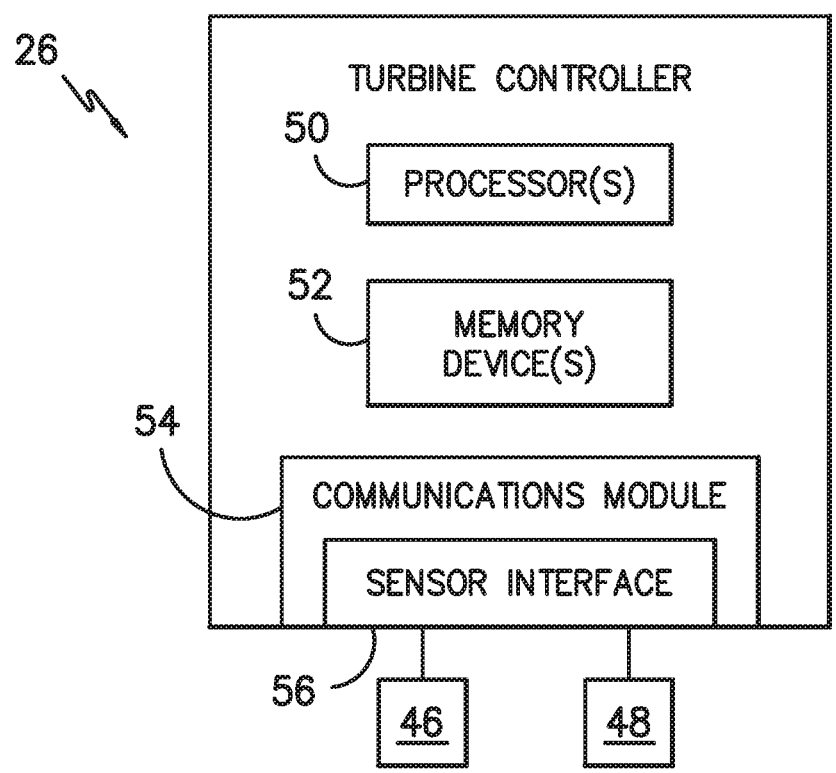
FIG. -3-

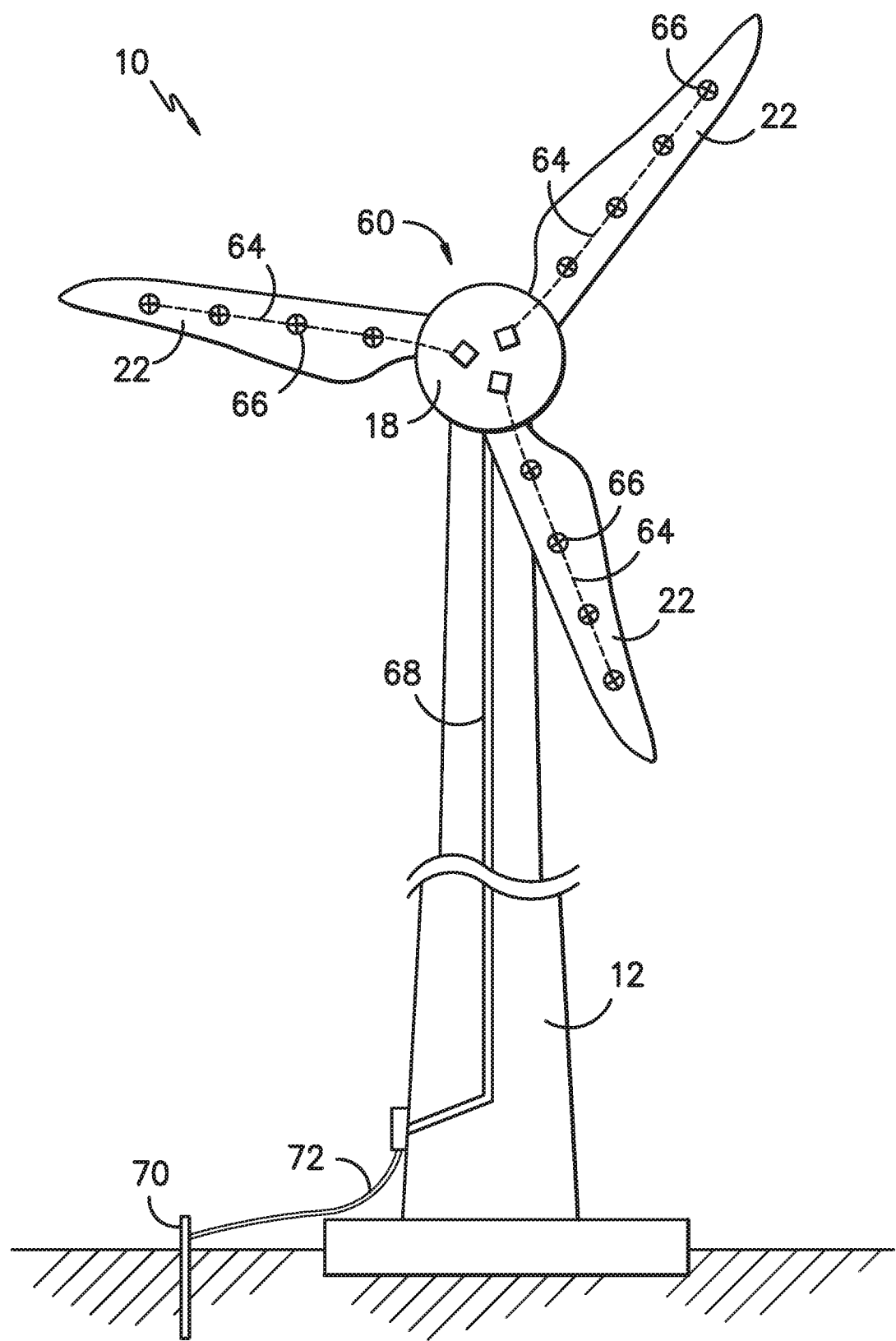
FIG. -4-

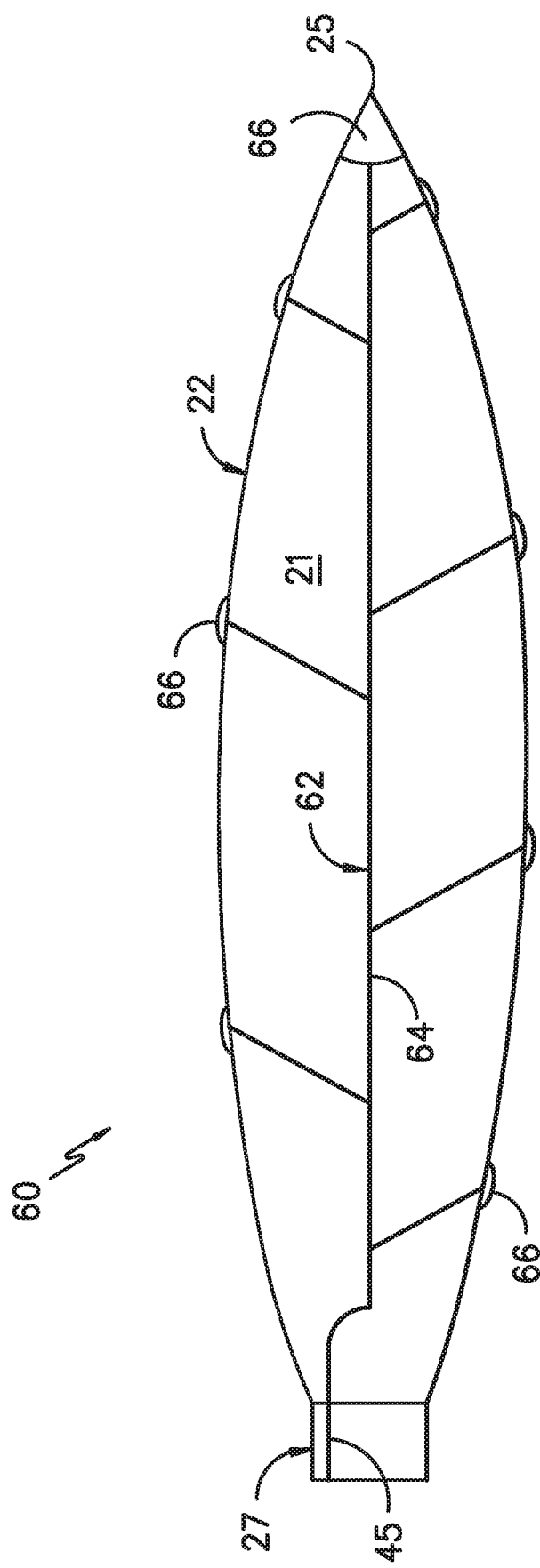
FIG. -5-

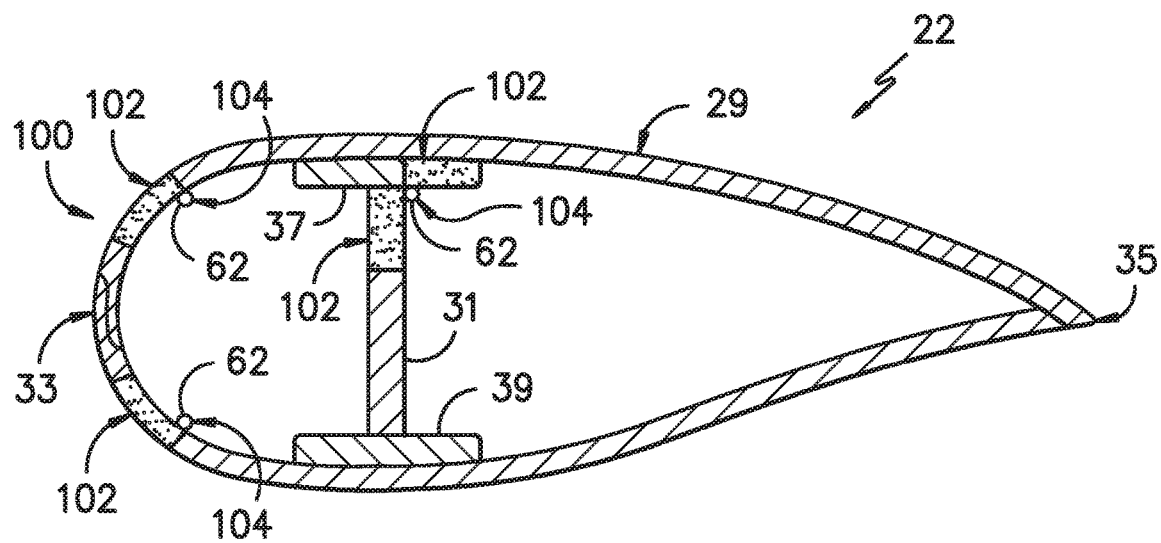
FIG. -6-
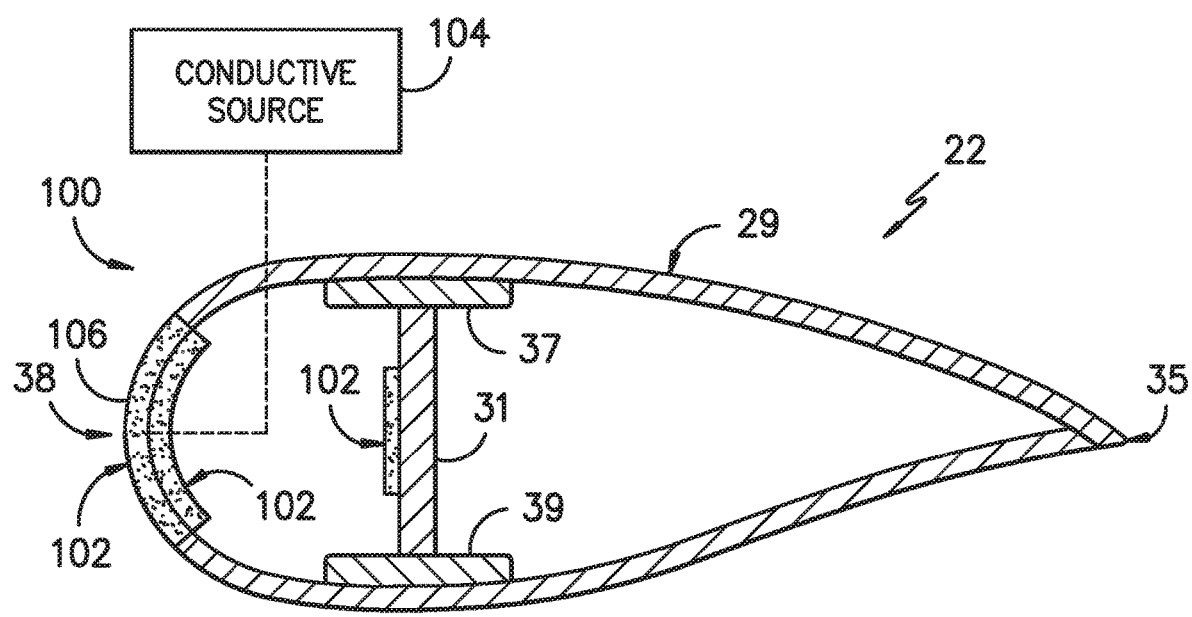
FIG. -7-

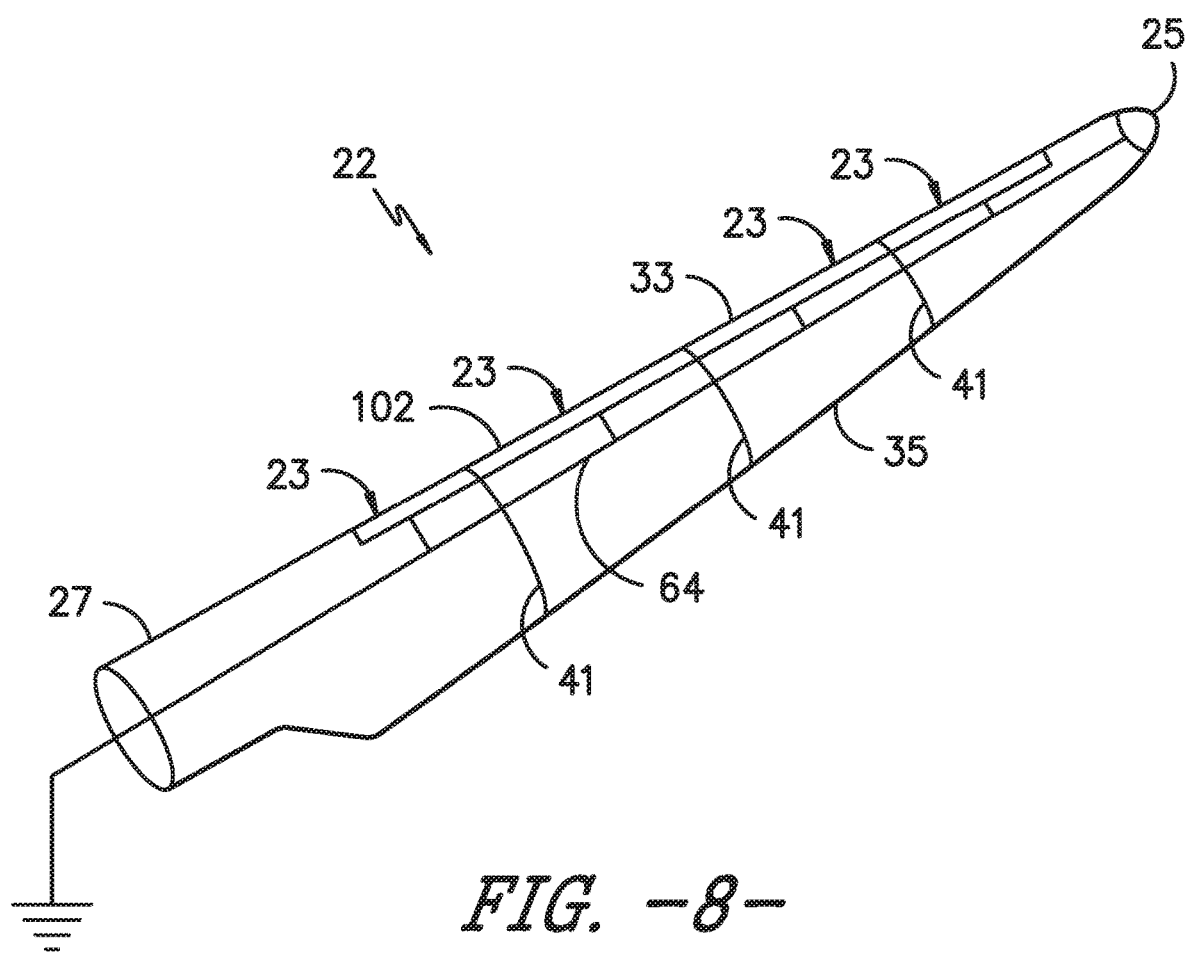
FIG. -8-

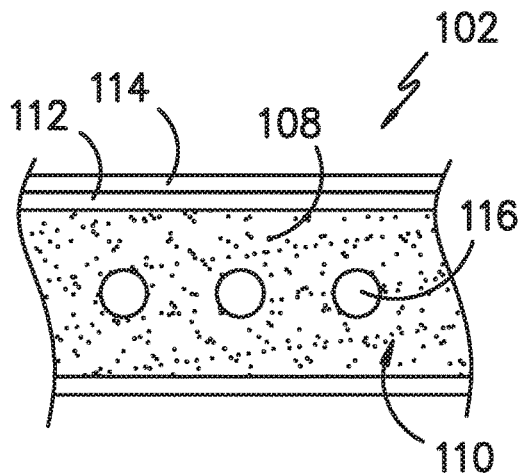
FIG. -9-
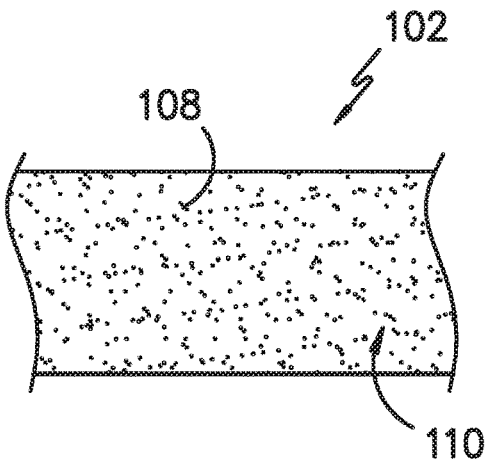
FIG. -10-
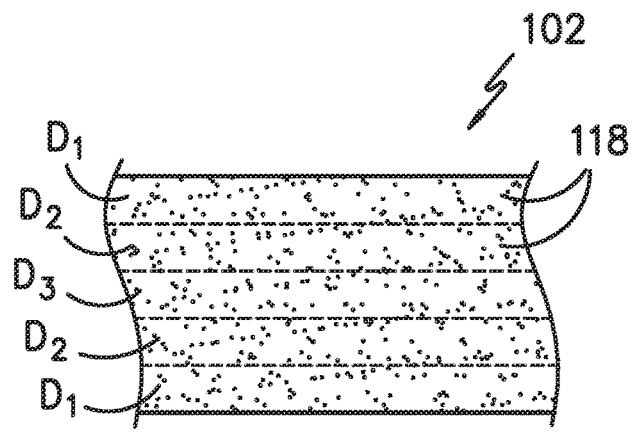
FIG. -11-

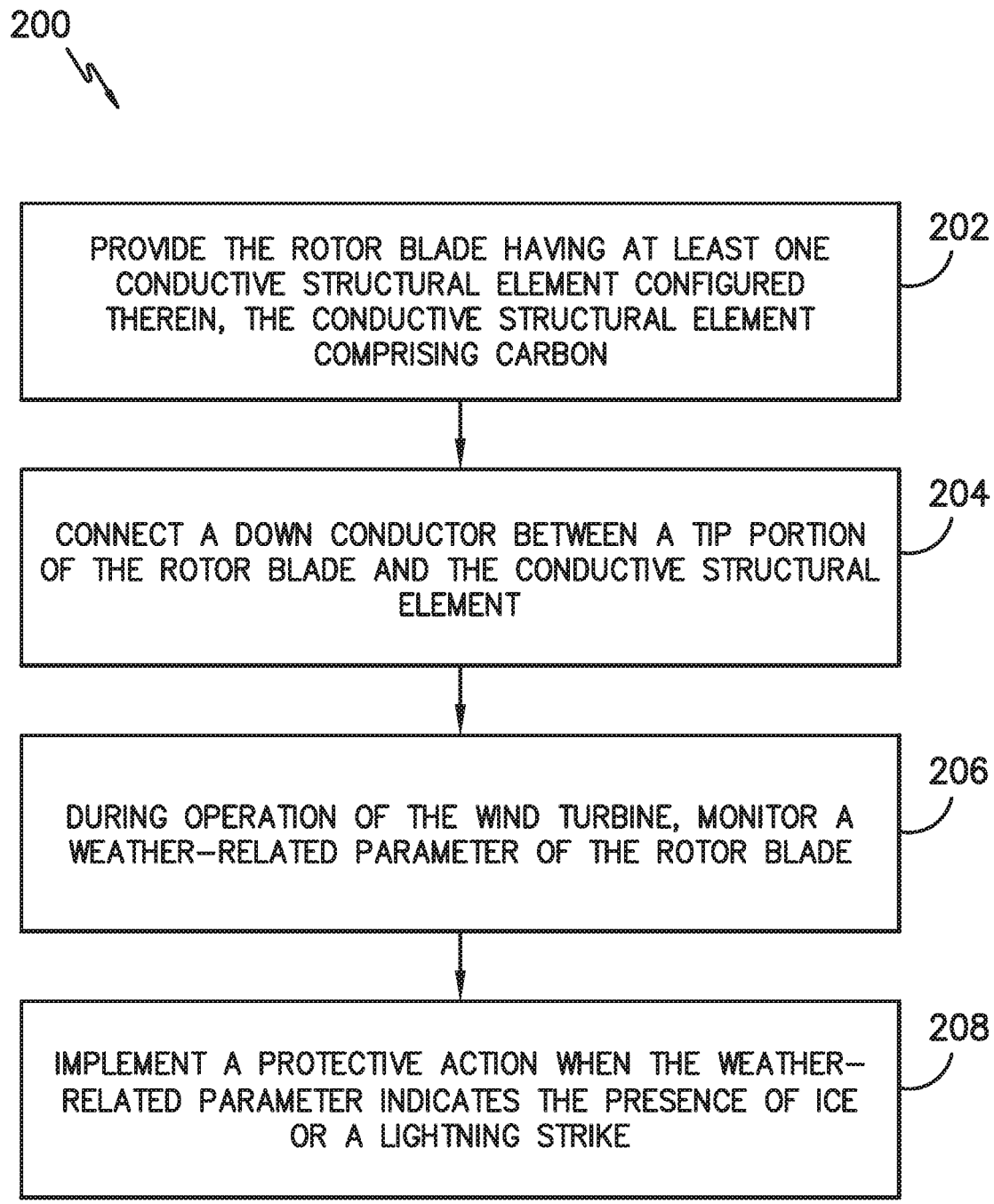
FIG. -12-

ORGANIC CONDUCTIVE ELEMENTS FOR DEICING AND LIGHTNING PROTECTION OF A WIND TURBINE ROTOR BLADE

FIELD OF THE INVENTION

The present subject matter relates generally to wind turbines and, more particularly, to organic conductive elements used for deicing and lightning protection of wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. Each rotor blade may be spaced about the hub so as to facilitate rotating the rotor to enable kinetic energy to be transferred from the wind into usable mechanical energy, and subsequently, electrical energy. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Under some atmospheric conditions, ice may be buildup or otherwise accumulate on the rotor blades of the wind turbine. As the ice layer accumulating on a rotor blade becomes increasingly thicker, the aerodynamic surface of the blade is modified, thereby resulting in diminished aerodynamic performance. Moreover, ice accumulation significantly increases the weight of a rotor blade, which can lead to structural damage as an increased amount of bending moments and/or other rotational forces act on the rotor blade. In addition, lightning strikes also cause costly damage to wind turbines that results in a loss of power production.

Due to the disadvantages associated with ice accumulation and/or lightning strikes, wind turbines are typically shutdown when it is believed that ice has accumulated on the surface of one or more of the rotor blades and/or when lightning is occurring near the wind turbine. Operation of the wind turbine may then be restarted after it can be verified that conditions have improved.

Accordingly, systems and methods for protecting wind turbines during such adverse conditions would be welcomed in the art. Thus, the present disclosure is directed to wind turbine blades containing organic conductive elements that can be used for deicing and/or lightning protection thereof.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes a rotor blade having a body shell with a pressure side, a suction side, a leading edge, and a trailing edge each extending between a root portion and a tip portion. Further, the rotor blade assembly includes a protection system configured to protect the rotor blade from ice accumulation and/or a lightning strike during operation of the wind turbine. More specifically, the protection system includes at least one organic conductive element configured within the rotor blade and a conductor source electrically and thermally coupled to the organic conductive element. Thus, the conductor source is configured to heat the organic conductive element so as to prevent ice from accumulating on the rotor blade, to remove ice already accumulated on the rotor blade, and/or to provide a conductive path for a lightning strike.

In one embodiment, the organic conductive element may be configured with one or more spar caps of the rotor blade, a shear web of the rotor blade, a leading edge bond cap of the rotor blade, the body shell of the rotor blade, or any other suitable rotor blade components. More specifically, in certain embodiments, the organic conductive element may be at least partially embedded into at least one of the spar caps, the shear web, and/or the body shell. For example, in particular embodiments, the organic conductive element may be embedded at or near the leading edge of the body shell, such as at a bond cap thereof. As such, the organic conductive element(s) may provide structural support to the rotor blade or may be non-structural.

In another embodiment, the organic conductive element may include carbon. More specifically, in certain embodiments, the organic conductive element may include a carbon-based foam material. For example, in certain embodiments, the foam material may be constructed of at least one of polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams. Further, in particular embodiments, the carbon-based foam material may be free of additives, binders, or fillers. In alternative embodiments, the carbon-based foam material may include non-organic additives, binders, fillers, and/or additional stiffening elements.

In additional embodiments, the conductor source may include a conductive cable of a lightning protection system, an electrical heater, one or more electrical resistors, forced air, an induction heater, a conductive heater, a convection heater, or similar. In further embodiments, the conductive cable(s) may be infused into a bond cap of the rotor blade.

In yet another embodiment, the rotor blade may be constructed of a plurality of rotor blade segments. In such embodiments, each of the rotor blade segments may be include at least a portion of the organic conductive element that can be connected together at one or more joints.

In another aspect, the present subject matter is directed to a lightning protection system for a rotor blade of a wind turbine. The lightning protection system includes a conductive circuit having a plurality of lightning receptors connected via one or more lightning conductors and an integrated deicing system. The integrated deicing system includes at least one organic conductive element configured with a body shell of the rotor blade. Further, the organic conductive element(s) includes, at least, carbon. As such, the conductive circuit is configured to heat the organic conductive element so as to prevent ice from accumulating on the rotor blade or to remove ice already accumulated on the rotor blade. It should be further understood that the lightning protection system and/or the integrated deicing system may further include any of the additional features as described herein.

In yet another aspect, the present disclosure is directed to a method for protecting a rotor blade of a wind turbine from ice accumulation and/or a lightning strike. The method includes providing the rotor blade having at least one organic conductive element configured therein. Further, the organic conductive element includes carbon. As such, the method also includes connecting a down conductor between a conductive tip portion of the rotor blade and the organic conductive element. During operation of the wind turbine, the method includes monitoring a weather-related parameter of the rotor blade. Further, the method includes implementing a protective action when the weather-related parameter indicates the presence of ice or a lightning strike. More specifically, in one embodiment, the step of implementing the protective action may include at least one of heating the organic conductive element via the down conductor or providing a conductive path for the lightning strike via the down conductor. It should be further understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a simplified, internal view of one embodiment of a nacelle of a wind turbine according to the present disclosure;

FIG. 3 illustrates a schematic diagram of one embodiment of suitable components that may be included within a turbine controller of a wind turbine according to the present disclosure;

FIG. 4 illustrates a perspective view of one embodiment of a wind turbine according to the present disclosure, particularly illustrating a lightning protection system thereof;

FIG. 5 illustrates a span-wise view of one embodiment of a wind turbine rotor blade according to the present disclosure, particularly illustrating a lightning protection system configured therewith;

FIG. 6 illustrates a cross-sectional view of one embodiment of a wind turbine rotor blade according to the present disclosure, particularly illustrating a plurality of structural organic conductive elements configured therein with a lightning protection system of the wind turbine;

FIG. 7 illustrates a cross-sectional view of another embodiment of a wind turbine rotor blade according to the present disclosure, particularly illustrating a plurality of organic conductive elements configured therein;

FIG. 8 illustrates a span-wise view of yet another embodiment of a wind turbine rotor blade according to the present disclosure, particularly illustrating a segmented rotor blade with each segment having an organic conductive element configured therewith;

FIG. 9 illustrates a cross-sectional view of one embodiment of a structural organic conductive element according to the present disclosure;

FIG. 10 illustrates a cross-sectional view of one embodiment of a non-structural organic conductive element according to the present disclosure;

FIG. 11 illustrates a cross-sectional view of one embodiment of an organic conductive element according to the present disclosure, particularly illustrating multiple densities in a single structure; and FIG. 12 illustrates a flow diagram of one embodiment of a method for protecting a rotor blade of a wind turbine from ice accumulation or a lightning strike according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for protecting a rotor blade of a wind turbine from ice accumulation and/or a lightning strike. Specifically, the disclosed protection system and method includes at least one organic conductive element (e.g. a carbon-based structural or non-structural foam element) that can be used to device the rotor blade and/or to protect the rotor blade during a lightning strike. As such, in certain embodiments, the organic conductive element can strategically replace an area of foam core in the rotor blade (e.g. at or near the leading edge of the rotor blade) and may provide structural support thereto. Further, the organic element may also be used to supplement an area of the rotor blade or be strategically placed. In addition, the protection system of the present disclosure may include a conductor source configured to heat the organic conductive element(s) so as to prevent ice from accumulating on the rotor blade and/or to provide a conductive path for the lightning strike.

Thus, the present disclosure provides many advantages not present in the prior art. For example, the protection system of the present disclosure provides deicing of the rotor blade(s) via one or more organic elements that are electrically and/or thermally conductive via carbon foam. Further, the system of the present disclosure may be integrated with an existing lightning protection system of the wind turbine. As such, the protection system of the present disclosure is configured to efficiently route a lightning strike through the organic conductive elements so as to minimize the number of points the electricity must touch the composite structure. Thus, the protection system of the present disclosure provides a way for deicing jointed blades since the joints or segments are electrically linked via the organic conductive elements.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 30 (FIG. 2) of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

Referring still to FIG. 2, the wind turbine 10 may also include a plurality of sensors 46, 48 for monitoring one or more parameters and/or conditions of the wind turbine 10. As used herein, a parameter or condition of the wind turbine 10 is "monitored" when a sensor 46, 48 is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26 or other suitable device to determine the actual parameter and/or condition.

Referring now to FIG. 3, there is illustrated a block diagram of one embodiment of suitable components that may be included within the turbine controller 26 in accordance with aspects of the present subject matter. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the pitch adjustment mechanisms 30, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 for controlling the pitch angle of the rotor blades 22. Moreover, the communications module 54 may include a sensor interface 56 (e.g., one or more analog-to-digital converters) to permit signals transmitted from the sensors 46, 48 of the wind turbine 10 to be converted into signals that can be understood and processed by the processors 50.

It should be appreciated that the sensors 46, 48 may be communicatively coupled to the communications module 54 using any suitable means. For example, as shown in FIG. 3, each sensor 46, 48 is coupled to the sensor interface 56 via a wired connection. However, in other embodiments, the sensors 46, 48 may be coupled to the sensor interface 56 via a wireless connection, such as by using any suitable wireless communications protocol known in the art.

Referring now to FIGS. 4 and 5, schematic diagrams of various components of a lightning protection system 60 are illustrated. More specifically, FIG. 4 illustrates a perspective view of one embodiment of a lightning protection system 60 configured with the wind turbine 10, whereas FIG. 5 illustrates a cross-sectional view of one of the rotor blades 22 of the wind turbine 10 having a portion of the lightning protection system 60 configured therein.

As shown, the lightning protection system 60 includes one or more conductive circuits 62 configured at least partially within the internal cavity 21 of one or more of the rotor blades 22. Further, as shown, the lightning protection system 60 includes a plurality of lightning receptors 66 configured along either or both pressure or suction sides of the blade 22. For example, in the illustrated embodiment, the lightning receptors 66 are provided on both of the pressure and suction sides. In an alternative embodiment, the lightning receptors 66 may be provided on only one of the sides of the rotor blade 22. It should be understood that the lightning receptors 66 may be variously configured within the scope and spirit of the invention, and may include any metal or metalized component (i.e., a metal screen, a metal rod or tip, and the like) mounted on the pressure and/or suction sides of the rotor blade 22 for the purpose of conducting lightning strikes to a ground.

In addition, each of the rotor blades 22 may be configured in a similar manner. For example, as shown in FIG. 5, each rotor blade 22 may include the lightning receptors 66 connected via one or more lightning conductors or conductive wires 64 within the internal cavity 21 of the rotor blade 22. As such, the conductive cables 64 may have a gauge suitable for defining a conductive leg for transmitting a lightning strike on any one of the receptors 66 to ground. Further, the conductive cable(s) 64 may be infused into a bond cap (such as the bond cap 106 of FIG. 7) of the rotor blade 22 and/or may be connected to an outer or inner surface of the rotor blade(s) 22.

Still referring to FIGS. 4 and 5, the respective lightning conductive circuits 62 for each of the rotor blades 22 may include terminal ends 45 that extend through the root portion 27 of the rotor blades 22 and are individually connected to a grounding system within the rotor hub 18. The grounding system may be variously configured, as is well known in the art. For example, the grounding system may include any conductive path defined by the wind turbine's machinery or support structure, including blade bearings, machinery bed plates, tower structure, and the like, that defines any suitable ground conductive path 68 from the rotor blades 22, through the tower 12, to a ground rod 70 via a ground cable 72, or other suitable electrical ground path. In other embodiments, the conductive circuit 62 may be defined by components that are embedded in the rotor blade 22, or are external to the rotor blade 22, for example along the outer surfaces of the rotor blade 22.

Referring particularly to FIG. 5, each rotor blade 22 may include a single conductive circuit 62, as depicted, with each of the lightning receptors 66 configured in series within the single circuit 62. In an alternative embodiment, each of the rotor blades 22 may include a plurality of circuits 62, with each of the lightning receptors 66 configured in one of the respective circuits 62. In still further embodiments, the receptors 66 may be connected in any suitable fashion via the conductive cable 64 (or carbon-based foam material) and it should be understood that the embodiment of FIGS. 4 and 5 is provided for example purposes only and is not intended to be limiting.

Referring now to FIGS. 6 and 7, schematic diagrams of various embodiments of a protection system 100 for a rotor blade of a wind turbine, e.g. the wind turbine 10 of FIG. 1, are illustrated. As shown, the protection system 100 includes at least one organic conductive element 102 configured within the rotor blade 22. More specifically, as shown in the illustrated embodiment of FIG. 6, the organic conductive element 102 may be at least partially embedded into the body shell 29 of the rotor blade 22, the shear web 31, a leading edge bond cap of the rotor blade 22, and/or one of the spar caps 37, 39. For example, as shown in FIG. 6, the organic conductive element(s) 102 is embedded within the body shell 29 of the rotor blade 22 at or near the leading edge 33 thereof. In addition, as shown in FIG. 7, the organic conductive element 102 may be embedded at the leading edge 33 of the rotor blade 22 and utilized as a structural bond cap 106 of the rotor blade 22. In addition, as shown in FIG. 7, the rotor blade 22 may include a non-structural organic conductive element 102 at the leading edge 33 that is not embedded into the body shell 29 of the rotor blade 22, but rather configured adjacent thereto. Further, the organic conductive element 102 may be embedded within the trailing edge 35 of the rotor blade 22.

Further, it should be understood that the organic conductive element(s) 102 may be completely or partially embedded into one or more the various rotor blade components as well as configured adjacent to one or more of the various rotor blade components (i.e. rather than being embedded). Moreover, rather than being embedded into the rotor blade 22 and/or its various components, it should be further understood that the organic conductive element(s) 102 may be mounted or otherwise secured to an exterior surface of one or more components of the rotor blade 22. For example, as shown in FIG. 7, one of the organic conductive element(s) 102 is mounted to an exterior surface of the shear web 31.

The organic conductive element(s) 102 as described herein may include a carbon material. More specifically, in certain embodiments, the organic conductive element 102 may include a carbon-based foam material. For example, in certain embodiments, the carbon-based foam material may be manufactured from ground coal that is melted and blown into the foam material. As such, the volatiles that naturally occur in the coal are configured to act as a blowing agent, thereby causing the melted coal to blow up into the foam material. Thus, the carbon-based foam material may include a highly porous solid carbon material. In addition, in certain embodiments, the organic conductive element 102 may be integrated with existing foam material within the rotor blade 22, including but not limited to polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams. Moreover, in particular embodiments, the carbon-based foam material may be free of additives or binders. In alternative embodiments, the carbon-based foam material may include non-organic additives, binders, fillers, and/or additional stiffening elements (e.g. structural members 116). For example, in one embodiment, the carbon-based foam material may be impregnated with non-organic additives, binders, and/or fillers.

Further, as shown in FIGS. 9 and 10, various embodiments of the organic conductive element(s) 102 of the present disclosure are illustrated. As shown in FIG. 9, a cross-sectional view of one embodiment of a structural organic conductive element 102 is illustrated, whereas FIG. 10 illustrates a cross-sectional view of one embodiment of a non-structural organic conductive element 102. More specifically, the structural organic conductive element 102 of FIG. 9 illustrates a sandwich configuration having a foam core 110 containing a carbon material 108 sandwiched between inner and outer skin layers 112, 114. In addition, as shown, a plurality of structural members 116 may also be optionally configured in the foam core 110 so as to provide additional structural support to the conductive element 102. The structural members 116 may have any suitable shape and/or configuration, including for example pultruded rods, rebar, and/or similar. As such, it should be understood that the density and/or structural properties of the conductive element 102 can be varied depending on the desired stiffness of the part. (i.e. which may depend on the desired location of the part in the rotor blade 22). Alternatively, as shown in FIG. 10, the organic conductive element 102 may be non-structural. More specifically, as shown, the non-structural conductive element 102 may contain only the carbon materials 100 in the foam core 110. It should be understood, however, that the non-structural conductive element 102 may also include one or more skin layers 112, 114 and/or structural members 116 and is not limited to pure foam.

In addition, as shown in FIG. 11, the conductive element 102 may include different densities configured as different layers 118 in the same structure. More specifically, as shown, the illustrated conductive element 102 includes three different densities $D_1$, $D_2$, and $D_3$. It should be further understood that the conductive element 102 may include any number of varying densities including less than three densities and more than three densities.

Referring back to FIGS. 6 and 7, the protection system 100 may also include a conductive source 104 configured to heat the organic conductive element 102 so as to prevent ice from accumulating on the rotor blade 22 and/or to remove ice already accumulated on the rotor blade. For example, as shown in FIG. 6, the conductive source 104 may correspond to various components of the lightning protection system 60. More specifically, as shown, one or more of the conductive cables 64 may be coupled to the organic conductive element(s) 102 so as to provide heat thereto as the element(s) have both conductive and thermal capabilities. In additional embodiments, the conductive source 104 may include any other suitable heating source, including but not limited to an electrical heater, one or more electrical resistors, forced air, an induction heater, a conductive heater, a convection heater, or similar.

Referring now to FIG. 8, a perspective view of another embodiment of one of the rotor blades 22 is illustrated. As shown, the rotor blade 22 may be constructed of a plurality of rotor blade segments 23 connected at one or more joints 41. In such embodiments, each of the rotor blade segments 23 may be include at least a portion of the organic conductive element(s) 102 that can be connected together when the rotor blade segments 23 are attached at the joints 41. More specifically, in certain embodiments, the separate portions of the organic conductive element(s) 102 may be connected to the terminal ends of the conductive cable 64 by pin joints, plate/cable connections and/or any other suitable connection schemes. It should also be understood that the conductive elements 102 of the present disclosure can be applied to rotor blades 22 having a fixed wing design in addition to the segmented design of FIG. 8.

In addition, as shown in FIGS. 6 and 8, the lightning protection system 60 may be configured with the organic conductive element(s) 102 such that the element(s) 102 provide an alternative approach to lightning protection of the rotor blade 22. More specifically, as shown, the conductive cable(s) 64 may be connected directly to the tip portion 25 of the rotor blade 22 and to the organic conductive element(s) 102. As such, current can flow through the electrically organic conductive element(s) 102 and through the down conductor 64. Further, it should be understood that the tip portion 25 of the rotor blade 22 may be manufactured via the carbon-based foam material as described herein.

Referring now to FIG. 12, there is illustrated a flow diagram of one embodiment of a method 200 for protecting a rotor blade 22 of a wind turbine 10 from ice accumulation and/or a lightning strike. As shown at 202, the method 200 includes providing the rotor blade 22 having at least one organic conductive element 12 configured therein. It should be understood that the rotor blade 22 may be formed using any suitable manufacturing methods known in the art, including but not limited to vacuum infusion, resin transfer molding, injection molding, or similar. Thus, the method 200 may also include embedding or attaching the organic conductive element 102 with the body shell 29 of the rotor blade 22 during the manufacturing process. More specifically, as mentioned, the organic conductive element(s) 102 may be embedded or attached into the body shell 29 at or near the leading edge 33 of the rotor blade 22. Alternatively, the organic conductive element(s) 102 may be embedded into the shear web 31 and/or spar caps 37, 39 of the rotor blade 22 (FIG. 6). As such, the organic conductive element(s) 102 are configured to structurally replace the standard foam and/or engineered core at various locations of the rotor blade 22. Further, the organic conductive element(s) 102 may be generally configured according to any of the embodiments described herein. Alternatively, the organic conductive element(s) 102 may be mounted or otherwise secured to one or more of the rotor blade components rather than being embedded therein.

Referring still to FIG. 12, as shown at 204, the method 200 may further include connecting a down conductor 64 between the tip portion 25 of the rotor blade 22 and the organic conductive element 102. Thus, as shown at 206, the method 200 also includes monitoring a weather-related parameter of the rotor blade 22 during operation of the wind turbine 10. For example, in one embodiment, the weather-related parameter of the rotor blade 22 may be monitored via the one or more sensors 46, 48 described herein. As used herein, the term "weather-related parameter" generally refers to any suitable parameter and/or condition that provides an indication of the presence of ice on a rotor blade 22 and/or the potential for a lightning strike. For example, the weather-related parameter may correspond to bending moments and/or other stresses acting on the rotor blade 22, as such bending moments and/or other stresses may generally vary due to the increased weight caused by ice accumulations. In such an embodiment, the sensors 46, 48 may correspond to strain gauges and/or other suitable sensors that permit such bending moments and/or other stresses to be monitored.

The sensors 46, 48 may then send the sensor signals to the turbine controller 26 which can implement a control action in response to the measured values. For example, as shown at 208, the method 200 may include implementing a protective action when the weather-related parameter indicates the presence of ice or a lightning strike. More specifically, the protective action may include heating the organic conductive element(s) 102 via the down conductor 64 and/or providing a conductive path for the lightning strike via the down conductor 64. Thus, it should be appreciated that the disclosed method 200 may be performed automatically by the turbine controller 26.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a rotor blade having a body shell comprising a pressure side, a suction side, a leading edge, and a trailing edge each extending between a root portion and a tip portion, the body shell being constructed of one or more foam materials; and,
   a protection system configured to protect the rotor blade from ice accumulation or a lightning strike, the protection system comprising:
   at least one organic conductive foam core embedded at or near the leading edge of the rotor blade in place of the one or more foam materials of the body shell, the at least one organic conductive foam core comprising a carbon-based foam core; and,
   a conductor source coupled to the at least one organic conductive foam core, the conductor source comprising at least a conductive cable infused into or configured adjacent to a leading edge bond cap of the rotor blade,
   wherein the conductor source is configured to heat the organic conductive foam core so as to prevent ice from accumulating on the rotor blade or to provide a conductive path for the lightning strike.

2. The rotor blade assembly of claim 1, further comprising an additional organic conductive foam core in at least one of, a spar cap of the rotor blade, or a shear web of the rotor blade.

3. The rotor blade assembly of claim 1, wherein the carbon-based foam core comprises at least one of additives, binders, fillers, or one or more structural members.

4. The rotor blade assembly of claim 1, wherein the carbon-based foam core is free of additives, binders, or fillers.

5. The rotor blade assembly of claim 2, wherein the conductor source further comprises at least one of an electrical heater, one or more electrical resistors, forced air, an induction heater, a conductive heater, or a convection heater.

6. The rotor blade assembly of claim 1, wherein the rotor blade is constructed of a plurality of rotor blade segments, each of the rotor blade segments comprising a portion of the organic conductive foam core.

7. A method for protecting a rotor blade of a wind turbine from ice accumulation or a lightning strike, the method comprising:
   providing a body shell of the rotor blade being constructed of one or more foam materials;
   embedding at least one organic conductive foam core at or near the leading edge of the rotor blade between the one or more foam materials, the organic conductive foam core comprising a carbon-based foam core;
   connecting a down conductor between a conductive tip portion of the rotor blade and the organic conductive foam core;
   during operation of the wind turbine, monitoring a weather-related parameter of the rotor blade; and,
   implementing a protective action when the weather-related parameter indicates the presence of ice or a lightning strike.

8. The method of claim 7, wherein implementing the protective action comprises at least one of heating the at least one organic conductive foam core via the down conductor or providing a conductive path for the lightning strike via the down conductor.

9. The method of claim 7, further comprising providing an additional organic conductive foam core in at least one of a spar cap of the rotor blade or a shear web of the rotor blade.

10. The method of claim 7, wherein the carbon-based foam core comprises at least one of additives, binders, fillers, or one or more structural members.

11. The method of claim 7, wherein the carbon-based foam core is free of additives, binders, or fillers.

* * * * *